US007206902B2

(12) United States Patent
Hakura et al.

(10) Patent No.: US 7,206,902 B2
(45) Date of Patent: *Apr. 17, 2007

(54) SYSTEM, APPARATUS AND METHOD FOR PREDICTING ACCESSES TO A MEMORY

(75) Inventors: Ziyad S. Hakura, Mountain View, CA (US); Brian Keith Langendorf, Benicia, CA (US); Stefano A. Pescador, Sunnyvale, CA (US); Radoslav Danilak, Santa Clara, CA (US); Brad W. Simeral, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 10/921,026

(22) Filed: Aug. 17, 2004

(65) Prior Publication Data
US 2006/0041723 A1    Feb. 23, 2006

(51) Int. Cl.
*G06F 12/00* (2006.01)
(52) U.S. Cl. .................. 711/137; 711/118; 711/154; 712/207; 712/237
(58) Field of Classification Search .................. 711/137
See application file for complete search history.

(56) References Cited

U.S. PATENT DOCUMENTS

| 5,146,578 | A | * | 9/1992 | Zangenehpour | 711/137 |
| 5,890,211 | A | * | 3/1999 | Sokolov et al. | 711/113 |
| 5,941,981 | A | * | 8/1999 | Tran | 712/207 |
| 6,247,107 | B1 | * | 6/2001 | Christie | 711/216 |
| 6,317,811 | B1 | * | 11/2001 | Deshpande et al. | 711/137 |
| 6,725,338 | B2 | * | 4/2004 | Gomez et al. | 711/137 |
| 6,760,817 | B2 | * | 7/2004 | Arimilli et al. | 711/137 |
| 6,820,173 | B1 | * | 11/2004 | Bittel et al. | 711/137 |
| 6,901,486 | B2 | * | 5/2005 | Handgen et al. | 711/137 |
| 7,032,076 | B2 | * | 4/2006 | Sprangle et al. | 711/137 |
| 2003/0105926 | A1 | * | 6/2003 | Rodriguez | 711/129 |

OTHER PUBLICATIONS

U.S. Appl. No. 09/791,417, filed Feb. 23, 2001.
U.S. Appl. No. 10/674,618, filed Sep. 29, 2003, Radoslav Danilak.
U.S. Appl. No. 10/712,520, filed Nov. 12, 2003, Radoslav Danilak.

* cited by examiner

*Primary Examiner*—Hong Kim
*Assistant Examiner*—Daniel Tsui
(74) *Attorney, Agent, or Firm*—Cooley Godward Kronish LLP

(57) ABSTRACT

A system, apparatus, and method are disclosed for predicting accesses to memory. In one embodiment, an exemplary apparatus comprises a processor configured to execute program instructions and process program data, a memory including the program instructions and the program data, and a memory processor. The memory processor can include a speculator configured to receive an address containing the program instructions or the program data. Such a speculator can comprise a sequential predictor for generating a configurable number of sequential addresses. The speculator can also include a nonsequential predictor configured to associate a subset of addresses to the address and to predict a group of addresses based on at least one address of the subset, wherein at least one address of the subset is unpatternable to the address.

28 Claims, 8 Drawing Sheets

SYSTEM, APPARATUS AND METHOD FOR PREDICTING ACCESSES TO A MEMORY

BRIEF DESCRIPTION OF THE INVENTION

This invention relates generally to computing systems, and more particularly, to predicting accesses to a memory, for example, by generating a configurable amount of predictions as well as by suppressing and filtering predictions.

BACKGROUND OF THE INVENTION

Prefetchers are used to fetch program instructions and program data so that a processor can readily avail itself of the retrieved information as it is needed. The prefetcher predicts which instructions and data the processor might use in the future so that the processor need not wait for the instructions or data to be accessed from system memory, which typically operates at a slower rate than the processor. With a prefetcher implemented between a processor and system memory, the processor is less likely to remain idle as it waits for requested data from memory. As such, prefetchers generally improve processor performance.

Generally, the more predictions generated by a prefetcher, the more likely that the prefetcher can arrange to have the necessary instructions and data available for a processor, thereby decreasing the latency of a processor. But conventional prefetchers typically lack sufficient management of the prediction process. Without such management, these prefetchers are prone to overload memory resources when the amount of predicted addresses exceeds what the prefetchers can handle. So to prevent resource overload, traditional prefetchers tend to be conservative in generating predictions so as not to generate an amount of predictions that could overload either the prefetcher or the memory resource.

In view of the foregoing, it would be desirable to provide a system, an apparatus and a method for effectively predicting accesses to memory. Ideally, an exemplary system, apparatus or method would minimize or eliminate at least the above-described drawbacks, for example, by generating a configurable amount of predictions as well as by suppressing and filtering predictions.

SUMMARY OF THE INVENTION

A system, apparatus, and method are disclosed for predicting accesses to memory. In one embodiment, an exemplary apparatus comprises a processor configured to execute program instructions and process program data, a memory including the program instructions and the program data, and a memory processor. The memory processor can include a speculator configured to receive an address containing the program instructions or the program data. Such a speculator can comprise a sequential predictor for generating a configurable number of sequential addresses. The speculator can also include a nonsequential predictor configured to associate a subset of addresses to the address. The nonsequential predictor can also be configured to predict a group of addresses based on at least one address of the subset, wherein at least one address of the subset is unpatternable to the address.

In another embodiment of the present invention, an exemplary method for predicting accesses to a memory is disclosed. This method comprises detecting an address from a stream of addresses, suppressing the prediction of one address as a next address, and generating one or more addresses to predict the next address based on the address, wherein at least one of the one or more addresses is nonsequential to the address. In an alternative embodiment, the method further comprises generating a number of sequential addresses based on the address to predict the next address, wherein the number of sequential addresses is configurable.

In yet another embodiment of the present invention, an exemplary prefetcher for predicting accesses to a memory is disclosed. An exemplary prefetcher comprises a first memory address predictor configured to associate a subset of addresses to an address, and to predict a group of addresses based on at least one address of the subset, wherein the at least one address of the subset is unpatternable to the address. In another embodiment, the prefetcher also includes a suppressor configured to suppress associating another subset of addresses to the address. In some embodiments, the exemplary prefetcher can include a cache and an inventory for filtering out redundant addresses.

BRIEF DESCRIPTION OF THE FIGURES

The invention is more fully appreciated in connection with the following detailed description taken in conjunction with the accompanying drawings, in which.

DETAILED DESCRIPTION OF EXEMPLARY EMBODIMENTS

The present invention provides a system, an apparatus and a method for effectively predicting accesses to memory for retrieving program instructions and program data that a processor might be expected to need. By effectively predicting accesses to memory, the latency of providing necessary data to one or more processors can be minimized. According to a specific embodiment of the present invention, an apparatus includes a speculator configured to predict memory accesses. An exemplary speculator can be configured to generate a configurable amount of predictions to vary the prediction generation rate. In another embodiment, a speculator can suppress the generation of certain predictions to limit quantities of unnecessary predictions, such as redundant predictions, that a prefetcher otherwise might be required to manage. In a specific embodiment, a speculator can also filter unnecessary predictions by probing whether a cache memory or an inventory containing predictions include a more suitable prediction for presentation to a processor.

Figure 1:
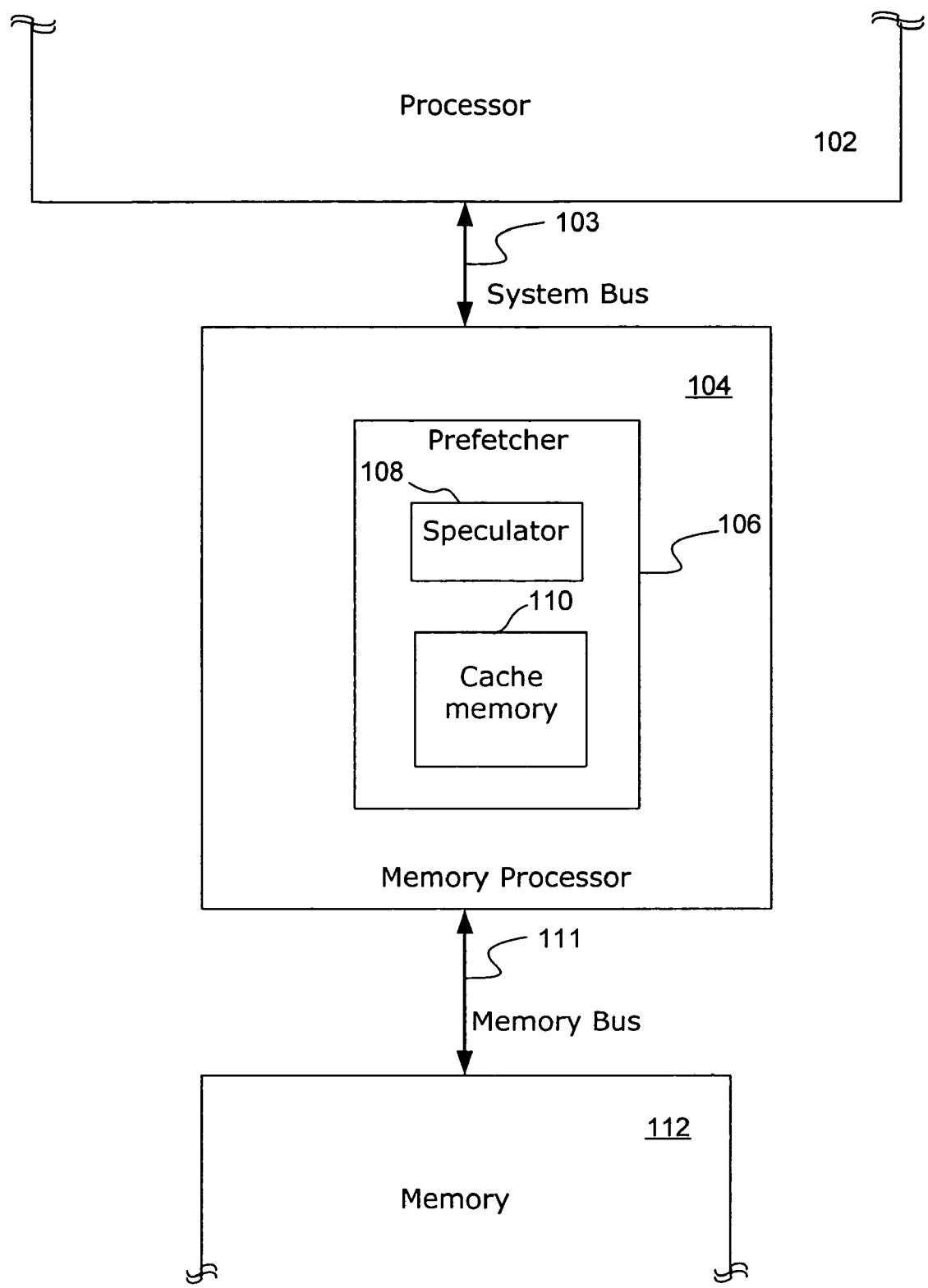
FIG. 1 is a block diagram illustrating an exemplary speculator implemented with a memory processor, according to a specific embodiment of the present invention.

FIG. 1 is a block diagram illustrating an exemplary speculator, according to a specific embodiment of the present invention. In this example, speculator 108 is shown to reside within a prefetcher 106. Further, prefetcher 106 is shown to reside in a memory processor 104, which is designed to at least control memory accesses by one or more processors. Prefetcher 106 operates to "fetch" both program instructions and program data from a memory 112 before being required, and then provide the fetched program instructions and program data to a processor 102 upon request by that processor. By fetching them prior to use (i.e., "prefetching"), processor idle time (e.g., the time during which processor 102 is starved of data) is minimized. Prefetcher 106 also includes a cache memory 110 for storing and managing the presentation of prefetched data to processor 102. Cache memory 110 serves as a data store for speeding-up instruction execution and data retrieval. Notably, cache memory 110 resides in prefetcher 106 and operates to supplement other memory caches, such as "L1" and "L2" caches, which are generally employed to decrease some latency apart from memory controller 104.

In operation, speculator 108 monitors system bus 103 for requests ("read requests") by processor 102 to access memory 112. In particular, as processor 102 executes program instructions, speculator 108 detects read requests for addresses that contain program instructions and program data yet to be used by processor 102. For purposes of discussion, an "address" is associated with a cache line or unit of memory that is generally transferred between memory 112 and cache memory 110. As such, the "address" of a cache line can refer to a memory location, and the cache line can contain data from more than one address of memory 112. The term "data" refers to a unit of information that can be prefetched, whereas the terms "program instructions" and "program data" respectively refer to instructions and data used by processor 102 in its processing. So, data (e.g., any number of bits) can represent program instructions as well as program data. Also, the term "prediction" can be used interchangeably with the term "predicted address," as determined by speculator 108. When a predicted address is used to access memory 112, one or more cache lines containing that predicted address, as well as other addresses (predicted or otherwise), is typically fetched.

Based on detected read requests, speculator 108 can generate a configurable number of predicted addresses that might likely be requested next by processor 102. Speculator 108 does so by using one or more speculation techniques in accordance with at least one embodiment of the present invention. Speculator 108 implements these speculation techniques as predictors, the implementations of which are described below. Moreover, speculator 108 suppresses the generation of some predictions and filters other predictions. By either suppressing or filtering certain predictions, or by doing both, the number of redundant predictions is decreased, thereby preserving resources. Examples of preserved resources include memory resources, such as cache memory 110, and bus resources (e.g., in terms of bandwidth), such as memory bus 111.

After the predictions of speculator 108 undergo optional filtering, memory processor 104 transports surviving predictions (i.e., not filtered out) via memory bus 111 to memory 112. In response, memory 112 returns the prefetched data with the predicted addresses. Cache memory 110 temporarily stores the returned data until such time that memory processor 104 sends that data to processor 102. At an appropriate point in time, memory processor 104 transports prefetched data via system bus 103 to processor 102 to ensure latency is minimized, among other things.

In a specific embodiment of the present invention, speculator 108 is disposed within a Northbridge-Southbridge chipset architecture such that memory processor 104 has at least some of the same functionalities of a Northbridge chip. In a Northbridge implementation, memory processor 104 can also be coupled via an AGP/PCI Express interface to a graphics processor unit ("GPU"). Moreover, system bus 103 can be a front side bus ("FSB") and memory 112 can be a system memory. Alternatively, speculator 108 can be employed in any other structure, circuit, device, etc. serving to control accesses to memory, as does memory processor 104. Further, speculator 108 and its elements can be composed of either hardware or software modules, or both. An example of speculator 108 is described next.

Figure 2:
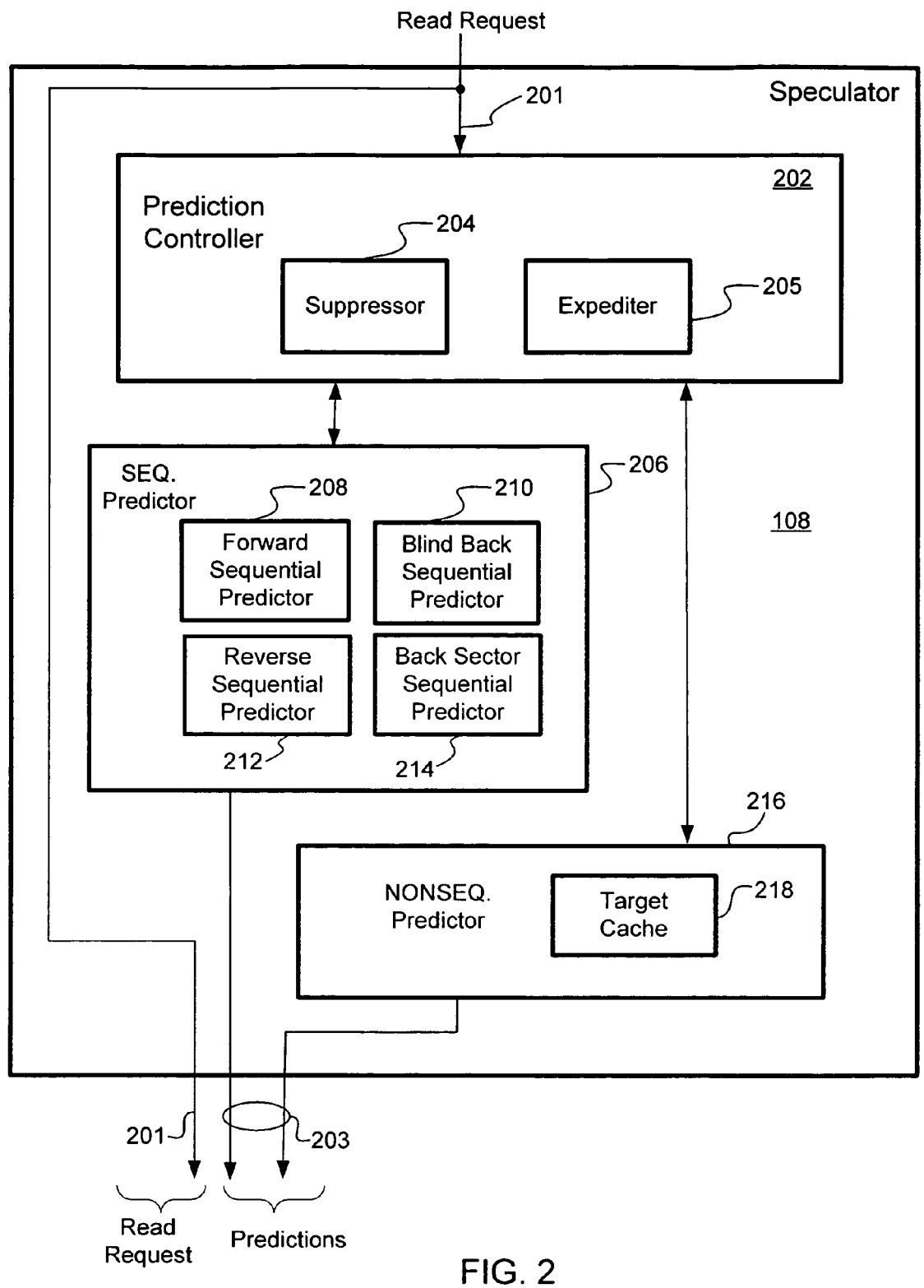
FIG. 2 depicts an exemplary speculator according to one embodiment of the present invention.

FIG. 2 depicts an exemplary speculator in accordance with one embodiment of the present invention. Speculator 108 is configured to receive read requests 201 from which it generates predictions 203. As shown, speculator 108 includes a prediction controller 202 configured to provide control information and address information to sequential predictor ("SEQ. Predictor") 206 and to nonsequential predictor ("NONSEQ. Predictor") 216, both of which generate predictions 203. Prediction controller 202 serves, in whole or in part, to govern the prediction generation process in a manner that provides an optimal amount and type of predictions. For example, prediction controller 202 can vary the number and the types of predictions generated for a particular cache line, or group of cache lines, specified in read request 201. As another example, prediction controller 202 includes a suppressor 204 to suppress the generation of certain predictions so as to preserve resources, such as available memory in target cache 218, or to minimize unnecessary accesses to memory 112 due to redundantly predicted addresses. Prediction controller 202 can optionally include expediter 205 to hasten the generation of nonsequential predictions. Expediter 205 operates, as described in FIG. 8, to trigger the generation of a nonsequential prediction prior to the detection of an address that immediately precedes the nonlinear address stream to which the nonsequential prediction relates. A more detailed discussion o prediction controller 202 is subsequent to the following descriptions of sequential predictor 206 and nonsequential predictor 216.

Sequential predictor 206 is configured to generate predictions (i.e., predicted addresses) having a degree of expectancy. That is, sequential predictor 206 generates predictions that might be expected to follow one or more patterns of regular read requests 201 over time. These patterns arise from the fact that memory references have spatial locality among themselves. For example, as processor 102 executes program instructions, a stream of read requests 201 can be sequential in nature as they traverse system bus 103. To predict addresses following a sequential pattern, a type of speculation technique described below as "forward sequential prediction" can predict sequential addresses. This type of speculation technique is described next.

Figure 3A:
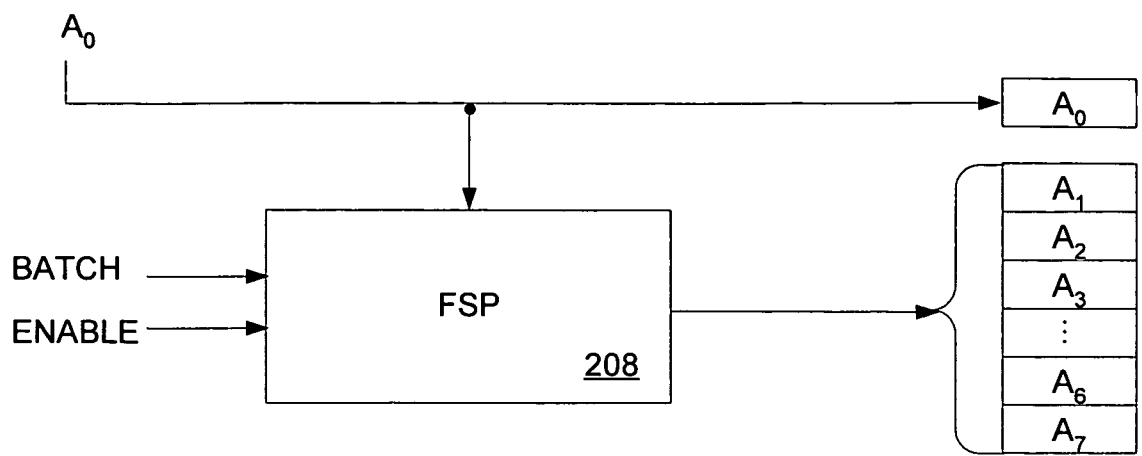
FIG. 3A depicts an exemplary forward sequential predictor in accordance with a specific embodiment of the present invention.

Forward sequential predictor 208 is configured to generate a number of sequential addresses, ascending in order. So, if processor 102 transmits a series of read requests 201 onto system bus 103 that include a stream of ascending addresses, then forward sequential predictor 208 will generate a number of predictions for prefetching additional ascending addresses. An example of forward sequential predictor ("FSP") 208 is depicted in FIG. 3A. As is shown in FIG. 3A, FSP 208 receives addresses, such as address A0, and generates one or more addresses in a forward (i.e., ascending) sequence from the A0 address. The notation of A0 identifies a base address (i.e., A+0) from which one or more predictions are formed. So, the notations A1, A2, A3, etc. represent addresses of A+1, A+2, A+3, etc., whereas the notations A(−1), A(−2), A(−3), etc. represent addresses of A−1, A−2, A−3, etc. Although these notations represent a series of addresses either ascending or descending by one address, any patternable set of addresses can be referred to as sequential. As used throughout, sequential addresses can be represented by and referred to as single letter. For example, "A" represents A0, A1, A2, A3, etc., and "B" represents B0, B1, B2, B3, etc. As such, "A" and "B" each represent sequential address streams, but address streams of "B" are nonsequential to those of "A."

Further to FIG. 3A, FSP 208 is shown to receive at least an enable signal and a batch signal, both of which are provided by prediction controller 202. The enable signal controls whether forward sequential predictions are to be generated, and if so, the batch signal controls the number of sequential addresses that FSP 208 generates. In this example, the batch signal indicates that "seven" addresses beyond the base address are to be predicted. And as such, FSP 208 generates forward-sequenced addresses A1 to A7. So, when speculator 108 receives an address as part of a read request 201, such as A0, sequential predictor 206 can provide addresses A1, A2, A3, . . . , Ab, as a portion of predictions 203, where b is the number "batch."

Figure 3B:
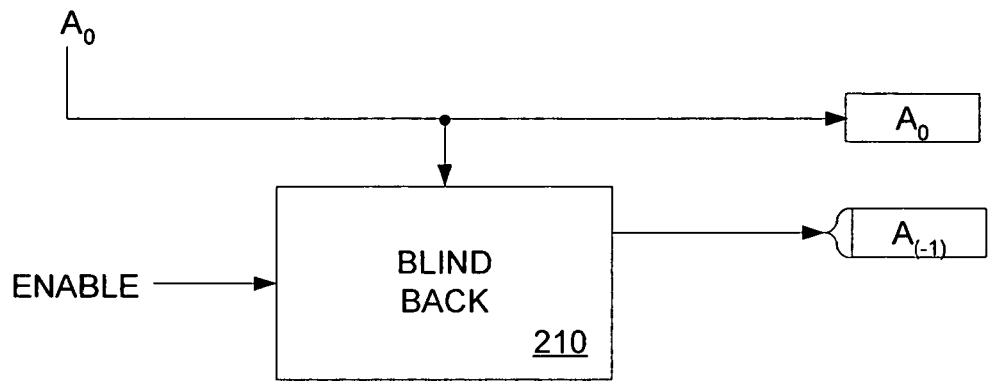
FIG. 3B depicts an exemplary blind back sequential predictor in accordance with a specific embodiment of the present invention.

Blind back sequential predictor 210 of FIG. 2 is configured to generate one sequential address, but descending in order from the base address. An example of blind back sequential predictor ("blind back") 210 is depicted in FIG. 3B, which shows blind back sequential predictor 210 receiving one or more addresses, such as address A0, and generating only one prediction, such as address A(−1), in a backward (i.e., descending) sequence from the A0 address. As is the case with FSP 208, blind back sequential predictor 210 also receives an enable signal to control whether it generates a backward prediction.

Back sector sequential predictor 214 of FIG. 2 is configured to generate a specific cache line as a prediction after it detects another specific cache line from system bus 103. In particular, if back sector sequential predictor 214 detects that a certain read request 201 is for a high-order cache line, then an associated low-order cache line is generated as a prediction. A high-order cache line can be referred to as an upper ("front") sector that includes an odd address, whereas a low-order cache line can be referred to as a lower ("back") sector that includes an even address. To illustrate, consider that a cache line contains 128 bytes and is composed of a high-order cache line of 64 bytes (i.e., upper half of 128 bytes) and a low-order cache line of 64 bytes (i.e., lower half of 128 bytes).

Figure 3C:
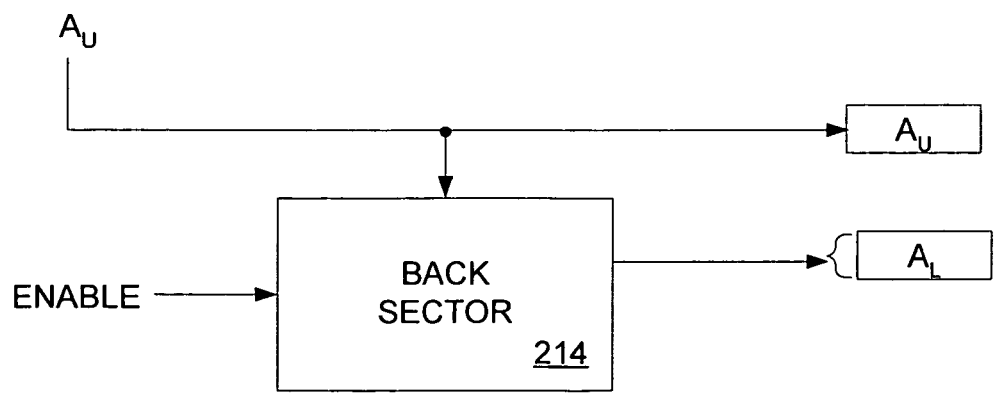
FIG. 3C depicts an exemplary back sector sequential predictor in accordance with a specific embodiment of the present invention.

An example of back sector sequential predictor 214 is depicted in FIG. 3C, which shows back sector sequential predictor ("back sector") 214 receiving one or more addresses. Upon receiving read request 201 for an upper or front sector of a cache line, such as address AU, back sector sequential predictor 214 generates only one prediction: address AL. This type of speculation technique leverages the phenomenon that processor 102 typically requests a lower or back sector sometime after requesting the upper or front sector of the cache line. Also, back sector sequential predictor 214 receives an enable signal to control whether it generates a back sector prediction.

Figure 3D:
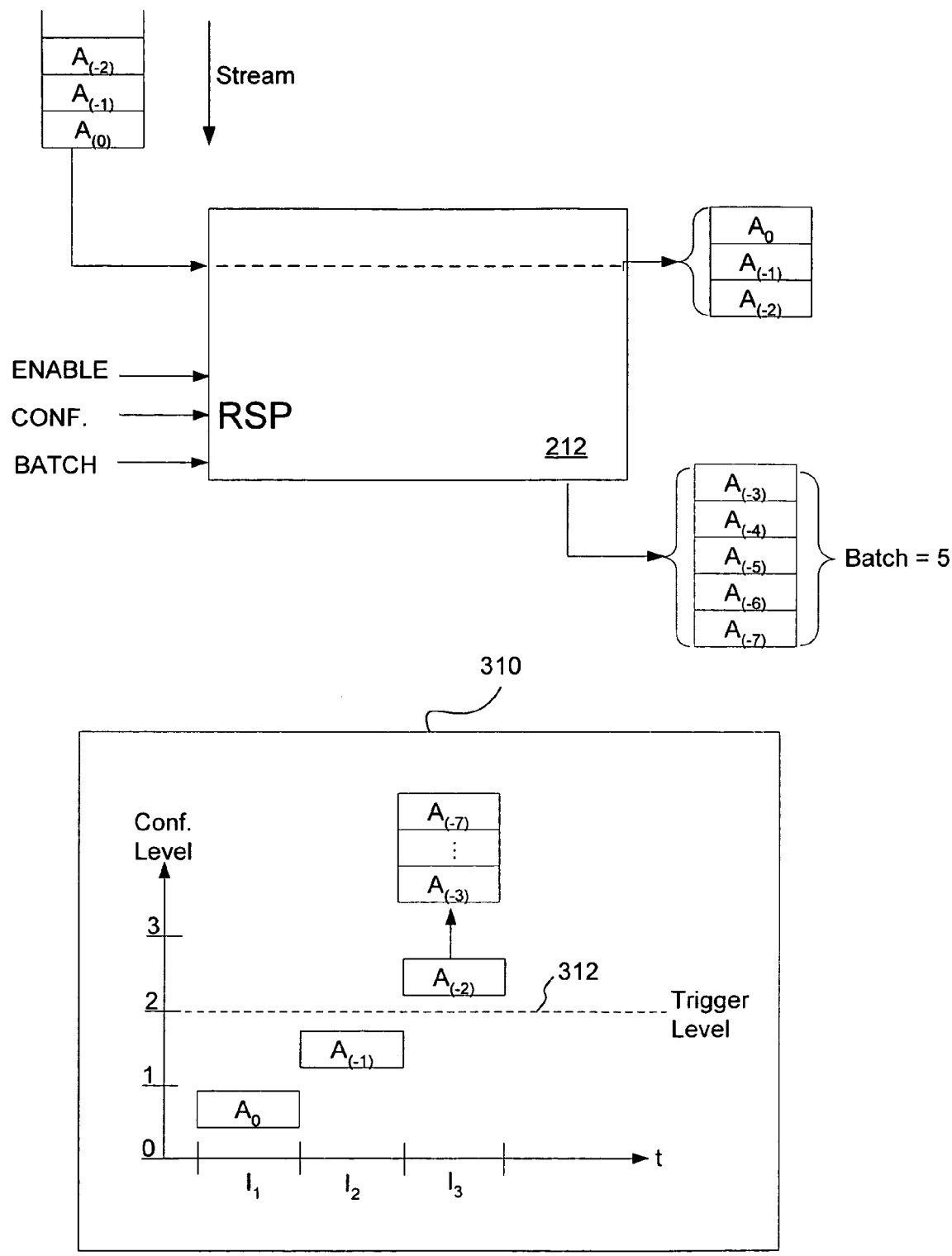
FIG. 3D depicts the behavior of an exemplary reverse sequential predictor in accordance with a specific embodiment of the present invention.

Reverse sequential predictor 212 of FIG. 2 is configured to generate a number of sequential addresses, descending in order. So if processor 102 transmits a series of read requests 201 onto system bus 103 that include a stream of descending addresses, then reverse sequential predictor 212 will generate a number of predictions for additional descending addresses. An example of reverse sequential predictor ("RSP") 212 is depicted in FIG. 3D. As is shown in FIG. 3D, RSP 212 detects a stream of addresses, such as addresses A0, A(−1), and A(−2), and in response, generates one or more addresses in a reverse (i.e., descending) sequence from base address A0. FIG. 3D also shows that RSP 212 receives at least an enable signal, a batch signal, and a confidence level ("Conf.") signal, all of which are provided by prediction controller 202. Although the enable signal and batch signal operate in a similar manner as used with FSP 208, the confidence level ("Conf.") signal controls a threshold that defines when to trigger the generation of reversely-sequenced predictions.

FIG. 3D further shows a chart 310 that depicts the behavior of an exemplary RSP 212, in accordance with a specific embodiment of the present invention. Here, a confidence level of "two" sets trigger level 312 and a batch signal indicates that "five" addresses beyond the trigger address to be predicted. A trigger address is an address that causes a predictor to generate predictions. Consider that after detecting A(0) during interval I1, RSP 212 also detects address A(−1) during a following interval, I2. Next, upon detecting address A(−2) during interval I3, a certain level of confidence is reached that the detected stream is a series of descending addresses. This level of confidence is reached when trigger level 312 is surpassed, which causes RSP 212 to generate reversely-sequenced addresses A(−3) to A(−7). So, when speculator 108 receives a certain number of addresses, such as A0, A(−1) and A(−2), as a series of a read requests 201, then sequential predictor 206 can provide addresses A(−3), A(−4), A(−5), . . . , Ab, as a portion of predictions 203, where b is the number "batch." Note that in some embodiments, RSP 212 does not employ a confidence level, but rather generates predictions beginning after the base address. In other embodiments of the present invention, the concept of a confidence level is employed in other predictors described herein. The control of RSP 212 and other constituent predictors of sequential predictor 206 are discussed further below; nonsequential predictor 216 of FIG. 2 is described next.

Nonsequential predictor 216 is configured to generate one or more predictions (i.e., predicted addresses) subsequent to an address detected by speculator 108, even when the address is within a nonlinear stream of read requests 201. Typically, when there is no observable pattern of requested addresses upon which to predict a next address, predictions based on the preceding address alone is difficult. But in accordance with an embodiment of the present invention, nonsequential predictor 216 generates nonsequential predictions, which include predicted addresses that are unpatternable from one or more preceding addresses. An "unpatternable" prediction is a prediction that cannot be patterned with or is irregular to a preceding address. One type of unpatternable prediction is the nonsequential prediction. A preceding address upon which a nonsequential prediction is based can be either an immediate address or any address configured as a trigger address. Notably, a lack of one or more patterns over two or more addresses in a stream of read requests 201 is indicative of processor 102 executing program instructions in a somewhat scattershot fashion in terms of fetching instructions and data from various spatial locations of memory locations.

Nonsequential predictor 216 includes a target cache 218 as a repository for storing associations from a preceding address to one or more possible nonsequential addresses that can qualify as a nonsequential prediction. Target cache 218 is designed to readily compare its contents against incoming, detected addresses for generating nonsequential predictions in a timely fashion. A detected address from which to generate a nonsequential prediction is referred to as a "trigger" address and the resulting prediction is a "target" of the unpatternable association between the two. An exemplary nonsequential predictor 216 is described next.

Figure 4:
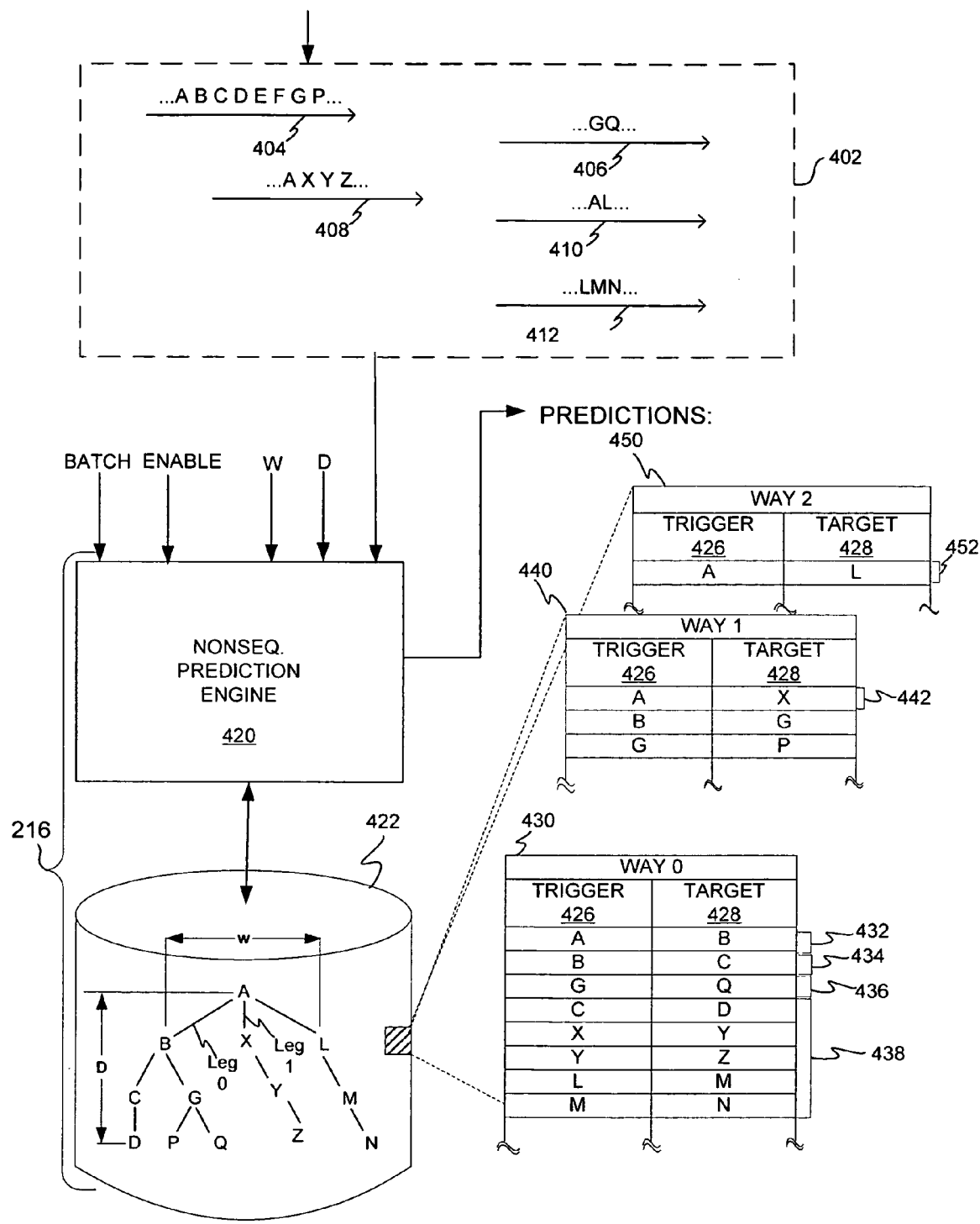
FIG. 4 illustrates an exemplary nonsequential predictor, according to one embodiment of the present invention.

FIG. 4 illustrates an exemplary nonsequential predictor 216, according to one embodiment of the present invention. Nonsequential predictor 216 includes a nonsequential prediction engine ("NonSeq. Prediction Engine") 420 operably coupled to a repository, which is target cache 422. Target cache 422 maintains associations between each trigger address and one or more corresponding target addresses. Note that FIG. 4 shows one of many ways with which to associate nonsequential addresses. Here, a tree structure relates a specific trigger address to its corresponding target addresses. In this example, target cache 422 includes address "A" as a trigger address from which to form associations to addresses of possible nonsequential predictions, such as addresses "B," "X," and "L." These three target addresses are also trigger addresses for respective addresses "C" and "G," "Y,", and "M." The formation and operation of target cache 422 is discussed in more detail below. Note that address "A" can also be a target address for a trigger address that is not shown in FIG. 4. Moreover, many other associations are also possible among addresses that are not shown.

Nonsequential prediction engine 420 is configured to receive at least four signals and any number of addresses 402. To control operation of nonsequential prediction engine 420, prediction controller 202 provides a "batch" signal and an "enable" signal, both of which are similar in nature to those previously described. Prediction controller 202 also provides two other signals: a width ("W") signal and a depth ("D") signal. These signals control the formation of target cache 422; the width signal, W, sets the number of possible targets from which a trigger address can predict, and the depth signal, D, sets the number of levels associated with a trigger address. An example of the latter is when D indicates a depth of "four." This means that address A is at a first level, address B is at a second level, addresses C and G are at a third level, and address D is at fourth level. An example of the former is when W is set to "two." This means only two of the three addresses "B," "X," and "L" are used for nonsequential prediction.

FIG. 4 also shows nonsequential prediction engine 420 configured to receive exemplary addresses 402 from prediction controller 202, such as addresses conceptually depicted in nonsequential address streams 404, 406, 408, 410 and 412, each of which includes an address that is unpatternable to a previously detected address. For example, stream 404 includes address "A" followed by address "B," which in turn is followed by address "C." As is the case with nonsequential addresses, detecting a pattern to predict "B" from "A," and to predict "C" from "B" is a difficult proposition without more than just monitoring read requests 201 from processor 102. To this end, nonsequential predictor 216 forms target cache 422 to enable the prediction of unpatternable associations between a specific trigger address and its target addresses. Once nonsequential prediction engine 420 forms a nonsequential prediction, it generates a group of predictions from the associated target address. So if trigger address "A" leads to a nonsequential prediction of address "B" (i.e., B0 as base address), then the predicted addresses would include B0, B1, B2, . . . Bb, where b is a number set by the batch signal.

In one embodiment of the present invention, nonsequential prediction engine 420 forms target cache 422 as it stores an association from each of addresses 402 to a subsequent address. For example, upon detecting address A of stream 404, nonsequential prediction engine 420 populates target cache 422 with associations, such as an association from A to B, an association from B to C, an association from C to D, etc. Nonsequential prediction engine 420 does the same when it detects addresses of other streams 406, 408, etc.

In accordance with a specific embodiment, target cache 422 stores these associations in tabular form, such as tables 430, 440 and 450. These tables include a trigger column 426 and a target column 428 for respectively storing associations between a trigger address and a target address. Next consider that addresses 402 of all the streams are stored in tables 430, 440, and 450 of target cache 422. As shown in table 430, trigger-target associations 432, 434, and 436 describe associations from A to B, from B to C, and from G to Q, respectively. Other trigger-target associations 438 include associations from C to D, and so on. Likewise, table 440 includes trigger-target association 442 to describe an association from A to X, and table 450 includes trigger-target association 452 to describe an association from A to L.

FIG. 4 shows that tables 430, 440, and 450 are respectively identified as "Way 0," "Way 1," and "Way 2," which describes the relative priority of multiple trigger-target associations for the same trigger address. In this case, Way 0 is associated with the highest priority, Way 1 with the second highest, and so on. In this example, trigger-target association 432 of table 430 indicates that the association from A to B is a higher priority than the association from A to X, which is trigger-target association 442 of table 440. So after target cache 422 includes these associations, the next time nonsequential prediction engine 420 detects address A (so long as prediction controller 202 enables nonsequential prediction engine 420 to operate), then address B will be predicted as highest priority, followed by address X as second-highest priority, etc. due to the relative priorities of the tables.

In accordance with one embodiment of the present invention, the relative priorities are determined in at least two ways. First, a trigger-target association is assigned with the highest priority when it is first detected and placed into target cache 422. Second, a trigger-target association is assigned with the highest priority when nonsequential prediction engine 420 determines that that trigger-target association is successful (e.g., there has been a most-recent cache hit resulting from the nonsequential prediction based on that particular association). A "most-recent" cache hit is a recent cache hit of at least one of the target addresses associated to a specific trigger address. Further, the previous "highest priority" (also designated as leg 0) is shuffled to the second highest priority (also designated as leg 1) by moving the corresponding association to the way 1 table. As an example, consider that at a first point in time that the association from A to X is introduced into target cache 422 as the first trigger-target association. As a result, it will be assigned the highest priority (i.e., initially at leg 0) by being placed into table 430 (i.e., way 0). At some later point in time, target cache 422 inserts the association from A to B into table 430 (highest priority, leg 0). Also, the association from A to X is moved to table 440 (second highest priority, leg 1). In a specific embodiment of the present invention, the table to which a trigger-target association is stored depends on a portion of the address bits that constitute an index.

According to a specific embodiment of the present invention, a suitable nonsequential predictor for implementing nonsequential predictor 216, in whole or in part, is described in U.S. patent application Ser. No. 10/920,682 filed on Aug. 17, 2004 having, titled "System, Apparatus and Method for Generating Nonsequential Predictions to Access a Memory," which is incorporated by reference in its entirety, for all purposes.

Referring back to FIG. 2, prediction controller 202 is configured to control both sequential predictor 206 and nonsequential predictor 216. Prediction controller 202 controls the amount as well as the types of predictions generated by either sequential predictor 206 or nonsequential predictor 216, or both. Also, prediction controller 202 suppresses the generation of predictions 203 that otherwise are unnecessary, such as redundant or duplicative predictions. As each of the predictors 208, 210, 212, 214 and 216 can be operational at the same time, the number of predictions 203 should be managed so as to not overload prefetcher resources. Prediction controller 202 employs suppressor 204 to perform this and other similar operations.

In one embodiment of the present invention, suppressor 204 controls the amount of predictions generated. It does so by first ascertaining certain attributes of read request 201. In particular, suppressor 204 determines whether read request 201 pertains to either program instructions (i.e., "code") or program data (i.e., "not code"). Typically, read requests 201 for retrieving code rather than program data tend to be more likely sequential in a nature, or at least patternable. This is because processor 102 generally executes instructions in a more linear fashion than its requests for program data. As such, suppressor 204 can instruct sequential predictor 206 or nonsequential predictor 216 to suppress prediction generation when read requests 201 relate to program data. This helps prevent generating spurious predictions.

Suppressor 204 can also adjust the amount of predictions that sequential predictor 206 and nonsequential predictor 216 generate by ascertaining whether read request 201 is a non-prefetch "demand" or a prefetch. Processor 102 typically will demand (as a non-prefetch demand) a program instruction or program data be retrieved from memory 112 in some cases where it is absolutely necessary, whereas processor 102 may only request to prefetch a program instruction or program data to anticipate a later need. Since an absolute need can be more important to service than an anticipated need, suppressor 204 can instruct specific predictors to suppress predictions based on prefetch read requests 201 in favor of predictions based on demand read requests 201.

Table I illustrates an exemplary technique for suppressing the number of predictions generated. That is, when read request 201 pertains to both code and to a demand, suppressor 204 will be least suppressive. That is, prediction controller 202 will set "batch" at a large size, which is denoted as Batch Size (4) in Table I. In a particular example, Batch Size (4) can be set to seven. But if for the reasons given above, when read request 201 relates to both program data (i.e., not code) and to a processor-generated prefetch, suppressor 204 will be most suppressive. As such, prediction controller 202 will set "batch" at a small size, which is denoted as Batch Size (1) in Table I. As an example, Batch Size (1) can be set to one. In other cases, prediction controller 202 can vary the level of prediction suppression by using other batch sizes, such as Batch Size (2) and Batch Size (3). Although a suppressor in accordance with one embodiment of the present invention is configured to suppress the generation of at least one predicted address by decreasing the "batch" quantity if a processor request is for data or a prefetch request, or both, Table I is not limiting. For example, a processor request for code or instructions could decrease the "batch" size rather increasing it. As another example, requests for a demand could also decrease the "batch" size rather increasing it. One having ordinary skill in the art should appreciate that the many variations are within the scope of the present invention.

TABLE I

| Read Request Types | | |
|---|---|---|
| Code or Data | Demand or Prefetch | Batch |
| Not Code (i.e., Data) | Prefetch | Batch Size (1) |
| Not Code (i.e., Data) | Demand | Batch Size (2) |
| Code | Prefetch | Batch Size (3) |
| Code | Demand | Batch Size (4) |

Suppressor 204 can also adjust the type of predictions that sequential predictor 206 and nonsequential predictor 216 generate. First, consider that prediction controller 202 can simultaneously enable both forward sequential predictor 208 and reverse sequential predictor 212. As such, suppressor 204 instructs prediction controller 202 to disable at least forward sequential predictor 208 when reverse sequential predictor 212 triggers (i.e., the confidence level is surpassed) so as to minimize predicting addresses in an ascending order when processor 102 is requesting read addresses in a descending order.

Second, consider that a certain address triggers back prediction (i.e., either blind back sequential predictor 210 or back sector sequential predictor 214) when prediction controller 202 enables sequential prediction (i.e., either forward sequential predictor 208 or reverse sequential predictor 212) to operate. In this case, suppressor 204 suppresses the batch by one from its initial amount for either forward sequential predictor 208 or reverse sequential predictor 212. That is, if "batch" was initially set to seven, then "batch" will be decreased by one upon triggering or activation of either blind back sequential predictor 210 or back sector sequential predictor 214. For example, if the batch for forward sequential predictor 208 is set to generate address A0, A1, A2, . . . , A7, and if blind back sequential predictor 210 is enabled for one or more read requests 201, then forward sequential predictor 208 generates only predictions A1, A2, ..., A6. The final result is a set of predictions A(-1), A(0), A1, A2, ..., A6 for those read requests 201, where back prediction provides prediction A(-1).

Third, prediction controller 202 can optionally disable either blind back sequential predictor 210 or back sector sequential predictor 214 to suppress their predictions after the first generated prediction in a sequential stream of addresses 201 from the processor. This is because after a base address of a sequence has been established, subsequent forward or reverse sequential predictions also predict backward-type speculations (albeit one address behind). For example, forward sequential predictions A2, A3, and A4 also cover backward-type predictions A1, A2, and A3, all of which have already been predicted (if the base address is A0). Suppressor 204 can be configured to suppress other types of predictions, examples of which follow.

Figure 5:
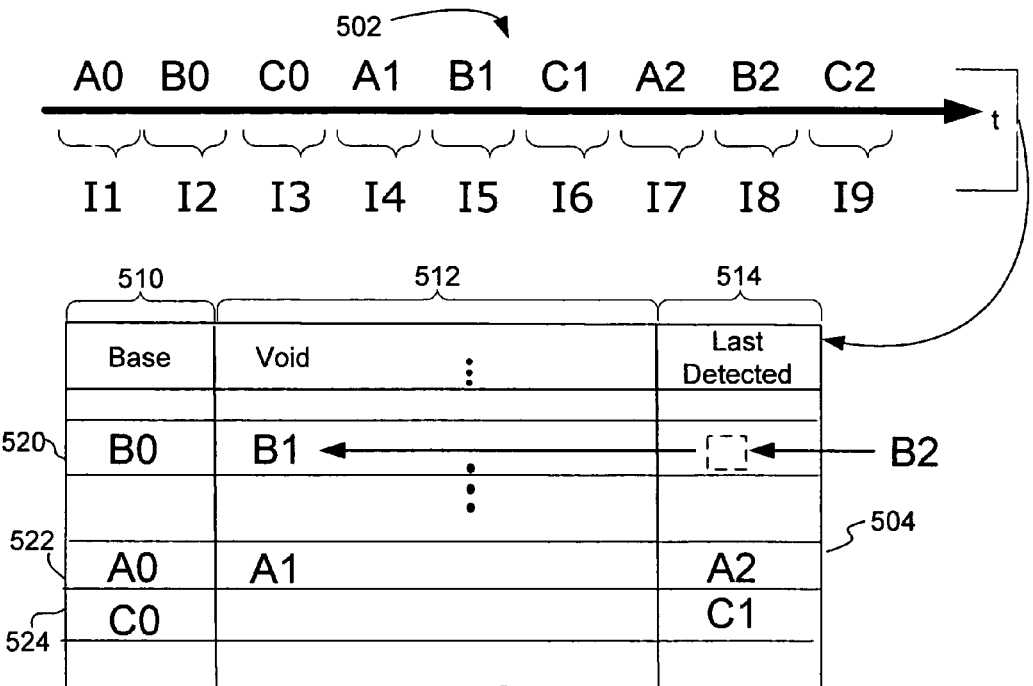
FIG. 5 illustrates an exemplary technique of suppressing nonsequential predictions for a stream of interleaved sequential addresses, according to one embodiment of the present invention.

FIG. 5 illustrates an exemplary technique of suppressing nonsequential predictions, according to one embodiment of the present invention. According to this technique, suppressor 204 detects interleaved sequential streams that otherwise could be considered nonsequential, which requires storage of trigger-target associations in target cache 422. To preserve resources, especially useable memory in target cache 422, suppressor 204 parses nonsequential addresses, such as in stream 502, and models those nonsequential addresses as interleaved sequential streams. As is shown, stream 502 is composed of addresses A0, B0, C0, A1, B1, C1, A2, B2, and C2, each detected during respective intervals I1, I2, I3, I4, I5, I6, I8, and I9. Suppressor 204 includes a data structure, such as table 504, to model the nonsequential addresses as sequential. Table 504 can contain any number of stream trackers for deconstructing stream 502. In particular, stream trackers 520, 522, and 524 are designed to model sequential streams B0, B1, and B2, A0, A1, and A2, and C0 and C1, respectively. Later-detected read addresses from stream 502, such as A7 (not shown), are compared against these streams to see whether nonsequential predictions still can be suppressed for those streams being tracked.

In operation, suppressor 204 tracks sequential streams by storing a base address 510, such as the first address of a sequence. Thereafter, suppressor 204 maintains a last-detected address 514. For each new last-detected address (e.g., B2 of stream tracker 520), the previous last-detected address (e.g., B1 of stream tracker 520) is voided ("void") by being placed in column 512, which is an optional column. With this exemplary technique, suppressor 204 suppresses the generation of unnecessary nonsequential predictions when other types of predictions can be used. So for the example shown in FIG. 5, forward sequential predictor 208 can adequately generate predictions for stream 502.

Figure 6:
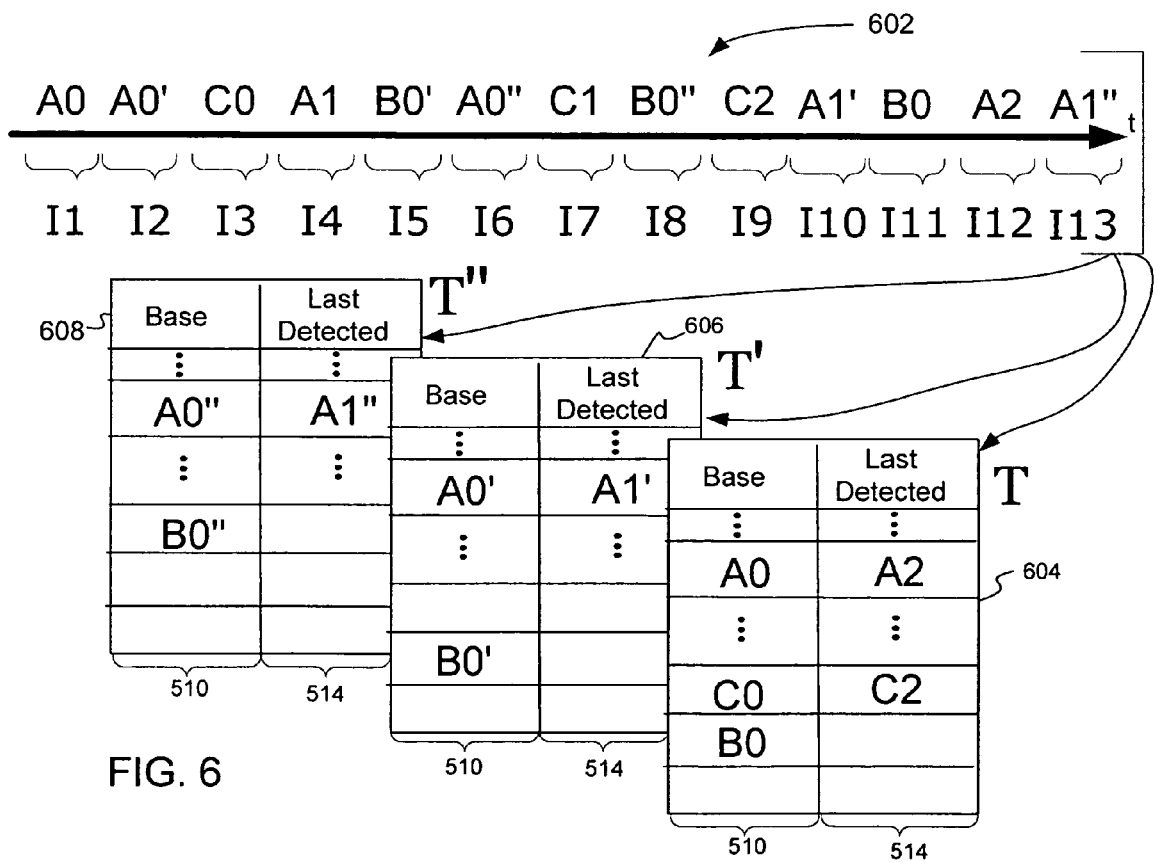
FIG. 6 illustrates an exemplary technique of suppressing nonsequential predictions for interleaved sequential addresses over multiple threads, according to one embodiment of the present invention.

FIG. 6 illustrates another exemplary technique of suppressing nonsequential predictions, according to one embodiment of the present invention. According to this technique, suppressor 204 models nonsequential addresses as interleaved sequential streams similar to the process described in FIG. 5. But the technique of FIG. 6 implements multiple data structures each used to detect sequential streams over any number of threads. In this example, tables 604, 606, and 608 include stream trackers for thread (0) ("T"), thread (1) ("T'") and thread (2) ("T''"), respectively. So with this technique, nonsequential addresses of stream 602 can be modeled as multiple sequential streams over multiple threads so as to suppress nonsequential predictions. Note that this technique can apply to reverse sequential streams or other types of predictions.

Figure 7:
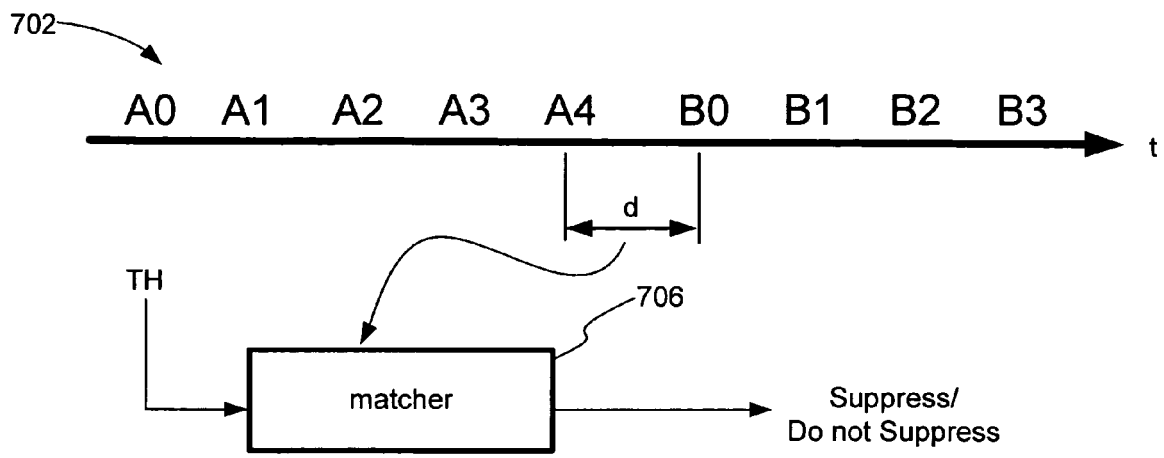
FIG. 7 illustrates another technique for suppressing nonsequential predictions based on the arrival times of the base address and a nonsequential address, according to a specific embodiment of the present invention.

FIG. 7 illustrates another technique for suppressing nonsequential predictions, according to a specific embodiment of the present invention. For a stream of addresses 702, a nonsequentiality exists between address A4 and B0. But in some cases, if the difference in time between these requested read addresses is too short, then there will not be enough time to employ nonsequential prediction. Matcher 706 of suppressor 204 operates to compare the difference in time, d, between address A4 and B0. If d is equal to or greater than a threshold, TH, then matcher 706 signals to enable (i.e., "not suppress") nonsequential predictor 216 to operate. But if d is less than TH, then matcher 706 signals to disable nonsequential predictor 216, thereby suppressing predictions.

Another suppression mechanism that can be implemented by suppressor 204 is as follows. Generally there is a finite amount of time that elapses before a request for a back sector address is made by processor 102, after requesting a front sector address. If the amount of time is long enough, then the back sector address read request may appear to be an irregularity (i.e., unpatternable to the front sector). To prevent this, suppressor 204 is configured to maintain a list of front sector reads by processor-102. Subsequent to detecting the front sector address, addresses are compared against that front sector address. When the corresponding back sector arrives, then it will be so recognized. Therefore, an otherwise nonsequentiality as well as its predictions can be suppressed.

Figure 8:
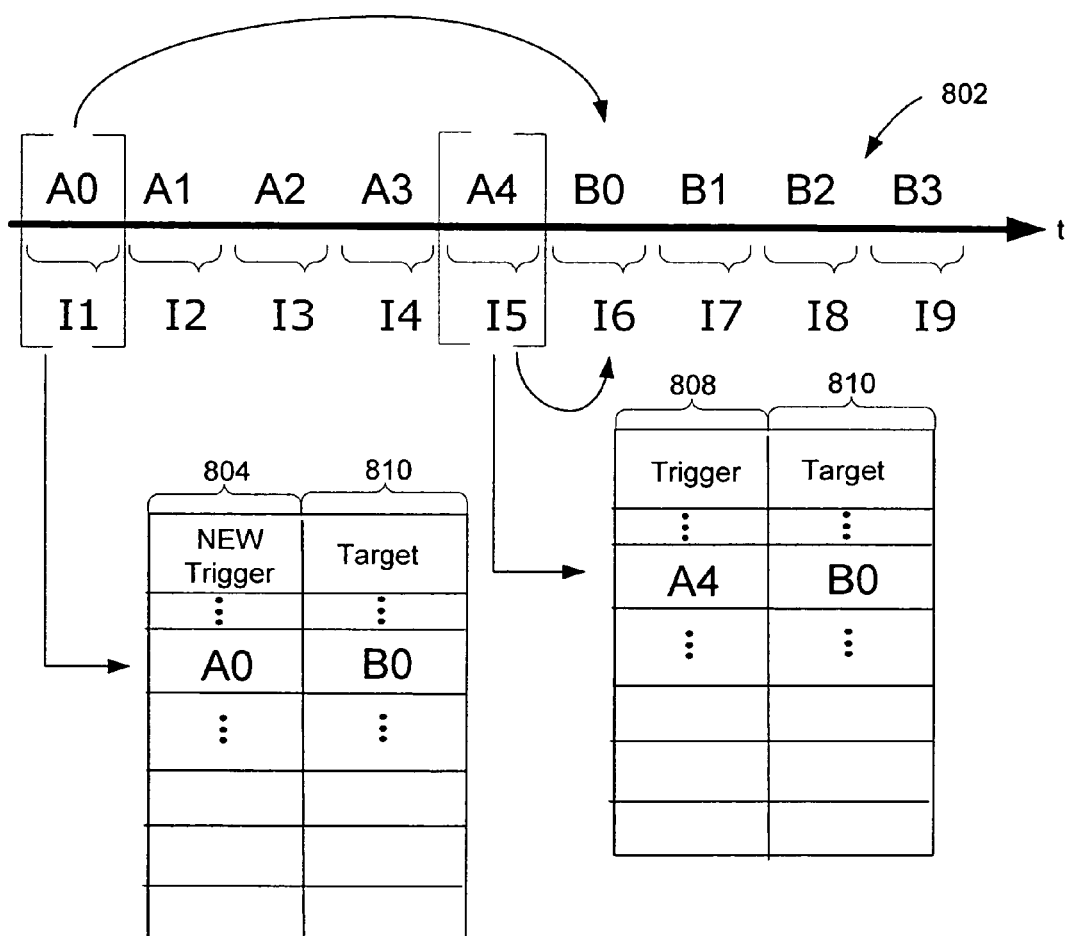
FIG. 8 depicts an exemplary technique for expediting generation of predictions, according to a specific embodiment of the present invention.

FIG. 8 depicts an exemplary technique for expediting generation of predictions, according to a specific embodiment of the present invention. Specifically, expediter 205 (FIG. 2) operates to in accordance with this technique to hasten the generation of nonsequential predictions. In this example, stream 802 includes two abutting sequential streams A0 to A4 and B0 to B3. Nonsequential predictor 216 typically designates address A4 as trigger address 808 with address B0 as target address 810. But to decrease the time to generate nonsequential predictions, trigger address 808 can be changed to new trigger address 804 (i.e., A0). So with the designation of a new trigger address for the target address, the next time processor 102 requests addresses of stream 802, nonsequential predictor 216 can immediately generate its predictions upon detecting an earlier address rather than a later address (i.e., generate predictions when A0 is detected as the "new" trigger address rather than A4). This ensures that the nonsequential predictions are generated at the most opportune time.

Figure 9:
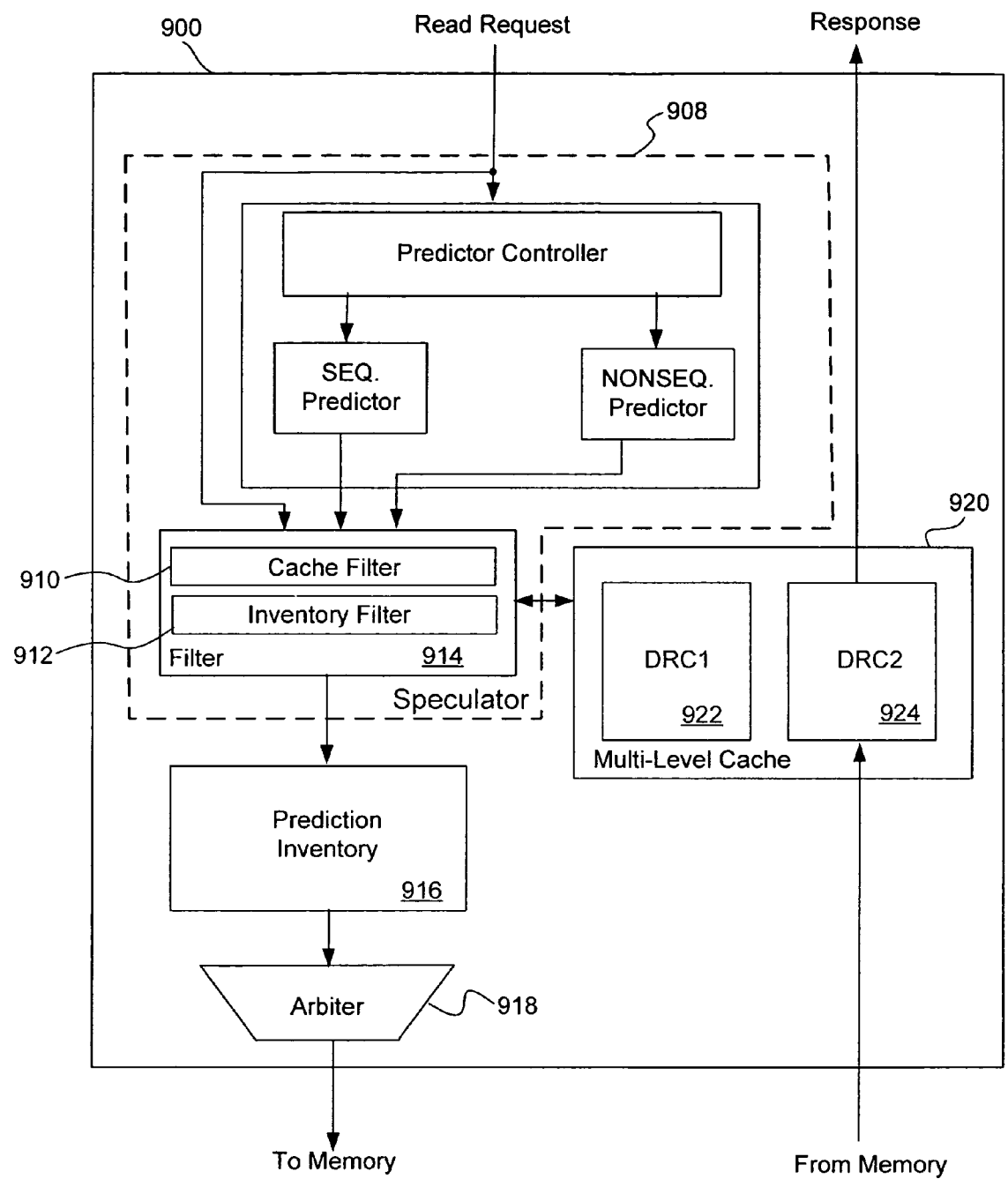
FIG. 9 shows another exemplary speculator including a prediction filter, according to one embodiment of the present invention Like reference numerals refer to corresponding parts throughout the several views of the drawings.

FIG. 9 shows another exemplary speculator, according to one embodiment of the present invention. In this example, prefetcher 900 includes a speculator 908 with a filter 914 for filtering redundant addresses so as to keep unnecessary prediction generation to a minimum. Prefetcher 900 of FIG. 9 also includes a multi-level cache 920 and a prediction inventory 916. Here, multi-level cache 920 is composed of a first level data return cache ("DRC1") 922 and a second level data return cache ("DRC2") 924. First level data return cache 922 can generally be described as a short-term data store and second level data return cache 924 can generally be described as a long-term data store. Multi-level cache 920 stores prefetched program instructions and program data from memory 112 until processor 102 requires them. Similarly, prediction inventory 916 provides temporary storage for generated predictions until selected by arbiter 918 to access memory 112. Arbiter 918 is configured to determine, in accordance with arbitration rules, which of the generated predictions are to be issued for accessing memory 112 to prefetch instructions and data.

Filter 914 includes at least two filters: cache filter 910 and inventory filter 912. Cache filter 910 is configured to compare newly-generated predictions to those previous predictions that prefetched instructions and data already stored in multi-level cache 920. So if one or more of the newly-generated predictions are redundant to any previously-generated prediction with respect to multi-level cache 920, then those redundant predictions are voided so as to minimize the number of predictions. Further, inventory filter 912 is configured to compare the newly-generated predictions against those already generated and stored in prediction inventory 916. Thus, if one or more of the newly-generated predictions are redundant to those previously stored in prediction inventory 916, then any redundant prediction can be voided so as to minimize the number of predictions, thereby freeing up prefetcher resources.

According to a specific embodiment of the present invention, a suitable data store for implementing multi-level cache 920, in whole or in part, is described in U.S. patent application Ser. No. 10/920,995 filed on Aug. 7, 2004 having, titled "System, Apparatus and Method for Performing Look-Ahead Look Up in Prefetcher Caches," which is incorporated by reference in its entirety, for all purposes. And according to another specific embodiment of the present invention, a suitable queue for implementing prediction inventory 916, in whole or in part, is described in U.S. patent application Ser. No. 10/920,610 filed on Aug. 17, 2004 having, titled "System, Apparatus and Method for Inventorying Predictions to Access a Memory," which is incorporated by reference in its entirety, for all purposes.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A prefetcher for predicting accesses to a memory comprising:
    a first memory address predictor configured to associate a subset of addresses to an address and to predict a group of addresses based on at least one address of said subset, wherein said at least one address of said subset is unpatternable to said address said first memory address predictor including:
        a nonsequential predictor to generate said group of addresses as nonsequential predictions when said address is detected, said nonsequential predictor including a repository for storing associations of said subset of addresses to said address in a manner that prioritizes each of said subset of addresses in relation to others, wherein said address is stored as a trigger address and said subset of addresses are stored as target addresses, and a nonsequential prediction engine configured to detect said address in a stream of addresses and is configured further to select said at least one address as a nonsequential prediction based on its priority being a highest priority, said highest priority being at least indicative that a processor has requested said at least one address most recently relative to others of said of addresses;
    a suppressor configured to suppress generating at least one predicted address; and
    an expediter to designate a first address of a sequential stream of addresses as a new trigger address for said at least one address if said trigger address is in said sequential stream and if said nonsequential predictions are generated sooner in time with said new trigger address than with said trigger address.

2. The prefetcher of claim 1 wherein said suppressor is further configured to suppress generating said group of addresses as nonsequential predictions if an interval of time from detection of said address as said trigger address to generation of said group of addresses as nonsequential predictions is less than a threshold.

3. The prefetcher of claim 2 wherein said threshold is defined by at least an amount of time between a first processor request and a second processor request that is less than the time necessary to prefetch said at least one of said group of addresses from memory, said first processor request being for said trigger address and said second processor request being for said at least one address.

4. The prefetcher of claim 1 wherein said suppressor is further configured to track a base address and a last-detected address for each of a plurality of interleaved sequential streams and to determine whether another address is within an address stream from said base address to said last-detected address for any of said plurality of interleaved sequential streams, and if so, suppress generating a predicted address based on said another address.

5. The prefetcher of claim 4 wherein each of a plurality of interleaved sequential streams is a portion of one of a number of threads.

6. The prefetcher of claim 1 wherein a batch quantity of addresses of said group is configurable to represent any number.

7. The prefetcher of claim 6 wherein said suppressor is configured to decrease said batch quantity if said address is related to either a request for data or a prefetch request, or both, thereby suppressing generation of said at least on predicted address.

8. The prefetcher of claim 6 further comprising a second memory address predictor that includes a sequential predictor for generating a number of other predicted addresses based on at least one other address.

9. The prefetcher of claim 8 wherein said number of other predicted addresses includes either:
    a first number of addresses sequenced in an ascending order from said at least one other address, or
    a second number of addresses sequenced in a descending order from said at least one other address,
    or both said first and said second number of addresses,
    wherein said first and said second numbers each are configurable.

10. The prefetcher of claim 9 wherein said suppressor is further configured to detect that said at least one other address is part of a first address stream ascending in order and to suppress those of said number of other predicted addresses that are based on said second number of addresses sequenced in said descending order, and to
    detect that said at least one other address is part of a second address stream descending in order and to suppress those of said number of other predicted addresses that are based on said first number of addresses sequenced in said ascending order.

11. The prefetcher of claim 8 wherein said number of other predicted addresses include either:
a back address sequenced by one in a descending order from said at least one other address, or
a back sector address of said at least one other address, or both.

12. The prefetcher of claim 11 wherein said suppressor is further configured to decrease said batch quantity by one if said number of other predicted addresses includes either said back address or said back sector address.

13. The prefetcher of claim 8 further comprising:
a cache memory; and
a filter to generate a subset of filtered addresses, said filter configured to void a redundant address in either
said cache memory or
said group of addresses and said number of other predicted addresses,
wherein said prefetcher is configured to provide at least one of said subset of filtered addresses.

14. The prefetcher of claim 8 further comprising:
an inventory; and
a filter to generate a subset of filtered addresses, said filter configured to void a redundant address in either
said inventory or
said group of addresses and said number of other predicted addresses,
wherein said prefetcher is configured to provide at least one of said subset of filtered addresses.

15. A prefetcher for predicting accesses to a memory comprising:
a first memory address predictor configured to associate a subset of addresses to an address and to predict a group of addresses based on at least one address of said subset, wherein said at least one address of said subset is unpatternable to said address said first memory' address predictor prioritizing each of said subset of address in relation to others, wherein said address is stored as a trigger address and said subset of addresses are stored as target addresses, and
a suppressor configured to suppress generating at least one predicted address; and
an expediter to designate a first address of a sequential stream of addresses as a new trigger address for said at least one address of said trigger address is in said sequential stream and if nonsequential predictions are generated sooner in time with said new trigger address that with said trigger address.

16. The prefetcher of claim 15 wherein said first memory address predictor further comprises a nonsequential predictor to generate said group of addresses as nonsequential predictions when said address is detected.

17. The prefetcher of claim 16 wherein said nonsequential predictor further comprises:
a repository for storing associations of said subset of addresses to said address in a manner that prioritizes each of said subset of addresses in relation to others, wherein said address is stored as a trigger address and said subset of addresses are stored as target addresses; and
a nonsequential prediction engine configured to detect said address in a stream of addresses and is configured further to select said at least one address as a nonsequential prediction based on its priority being a highest priority.

18. The prefetcher of claim 17 wherein said highest priority is at least indicative that a processor has requested said at least one address most recently relative to others of said subset of addresses.

19. The prefetcher of claim 15 wherein said suppressor is further configured to track a base address and a last-detected address for each of a plurality of interleaved sequential streams and to determine whether another address is within an address stream from said base address to said last-detected address for any of said plurality of interleaved sequential streams, and if so, suppress generating a predicted address based on said another address.

20. The prefetcher of claim 19 wherein said threshold is defined by at least an amount of time between a first processor request and a second processor request that is less than the time necessary to prefetch said at least one of said group of addresses from memory, said first processor request being for said trigger address and a said second processor request being for said at least one address.

21. The prefetcher of claim 20 wherein said threshold is defined by at least an amount of time between a first processor request for said trigger address and a second processor request for said at least one address that is less than the time necessary to prefetch said at least one of said group of addresses from memory.

22. The prefetcher of claim 17 wherein said suppressor is further configured to track a base address and a last-detected address for each of a plurality of interleaved sequential streams and to determine whether another address is within an address stream from said base address to said last-detected address for any of said plurality of interleaved sequential streams, and if so, suppress generating said at least predicted address based on said another address.

23. The prefetcher of claim 22 wherein each of a plurality of interleaved sequential streams is a portion of one of a number of threads.

24. The prefetcher of claim 15 wherein a batch quantity of addresses of said group is configurable to represent any number.

25. The prefetcher of claim 24 wherein said suppressor is configured to decrease said batch quantity if said address is related to either a request for data or a prefetch request, or both, thereby suppressing generation of said at least one predicted address.

26. The prefetcher of claim 24 further comprising a second memory address predictor that includes a sequential predictor for generating a number of other predicted addresses based on at least one other address.

27. The prefetcher of claim 26 wherein said number of other predicted address includes either:
a first number of addresses sequenced in an ascending order from said at least one other address, or
a second number of addresses sequenced in a descending order from said at least one other address,
or both said first and said second number of addresses,
wherein said first and said second numbers each are configurable.

28. The prefetcher of claim 26 wherein said suppressor is further configured to
detect that said at least one other address is part of a first address stream ascending in order and to suppress those of said number of other predicted addresses that are based on said second number of addresses sequenced in said descending order, and to
detect that said at least one other address is part of a second address stream descending in order and to suppress those of said number of other predicted addresses that are based on said first number of addresses sequenced in said ascending order.

* * * * *